United States Patent
Cui et al.

(10) Patent No.: US 10,315,264 B2
(45) Date of Patent: Jun. 11, 2019

(54) JOINING PROCESS AND JOINED ARTICLE

(71) Applicant: GENERAL ELECTRIC COMPANY, Schenectady, NY (US)

(72) Inventors: Yan Cui, Greer, SC (US); Srikanth Chandrudu Kottilingam, Simpsonville, SC (US); Brian Lee Tollison, Honea Path, SC (US); Dechao Lin, Greer, SC (US); David Edward Schick, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 819 days.

(21) Appl. No.: 14/477,389

(22) Filed: Sep. 4, 2014

(65) Prior Publication Data

US 2014/0369741 A1    Dec. 18, 2014

Related U.S. Application Data

(63) Continuation-in-part of application No. 13/753,040, filed on Jan. 29, 2013, now abandoned.

(51) Int. Cl.
| | |
|---|---|
| *B23K 20/12* | (2006.01) |
| *B23K 1/00* | (2006.01) |
| *B23K 28/02* | (2014.01) |
| *B23K 101/00* | (2006.01) |
| *B23K 103/08* | (2006.01) |
| *B23K 103/18* | (2006.01) |

(52) U.S. Cl.
CPC ............ *B23K 1/0018* (2013.01); *B23K 20/12* (2013.01); *B23K 20/1205* (2013.01); *B23K 20/129* (2013.01); *B23K 28/02* (2013.01); *B23K 2101/001* (2018.08); *B23K 2103/08* (2018.08); *B23K 2103/18* (2018.08); *B23K 2103/26* (2018.08); *Y10T 403/478* (2015.01)

(58) Field of Classification Search
CPC .. B23K 1/0018; B23K 20/12; B23K 20/1205; B23K 20/129; B23K 2201/001; B23K 2203/08; B23K 2203/18; Y10T 403/478
See application file for complete search history.

(56) References Cited

U.S. PATENT DOCUMENTS

| | | |
|---|---|---|
| 3,571,905 A | 3/1971 | Calton et al. |
| 3,731,959 A | 5/1973 | Calton et al. |

(Continued)

FOREIGN PATENT DOCUMENTS

GB          1012931 A     12/1965

OTHER PUBLICATIONS

Schunk Group, "Manufacturing process metal injection moulding technology (MIM)", Dec. 6, 2006.*

(Continued)

*Primary Examiner* — Erin B Saad
*Assistant Examiner* — Carlos J Gamino
(74) *Attorney, Agent, or Firm* — McNees Wallace & Nurick LLC

(57) ABSTRACT

A joining process and a joined article are disclosed. The joining process includes positioning an article having a base material, and friction joining a pre-sintered preform to the base material. The pre-sintered preform forms a feature on the article. The joined article includes a feature joined to a base material by friction joining of a pre-sintered preform.

26 Claims, 1 Drawing Sheet

(56) References Cited

U.S. PATENT DOCUMENTS

| | | | |
|---|---|---|---|
| 3,779,446 A * | 12/1973 | Lemelson | B23K 5/08 |
| | | | 228/15.1 |
| 4,119,261 A | 10/1978 | Devine, Jr. | |
| 5,248,077 A | 9/1993 | Rhoades et al. | |
| 5,590,386 A | 12/1996 | Patrician et al. | |
| 5,653,377 A | 8/1997 | Reatherford et al. | |
| 5,919,719 A | 7/1999 | Sato et al. | |
| 7,051,435 B1 | 5/2006 | Subramanian et al. | |
| 7,210,611 B2 | 5/2007 | Sanders et al. | |
| 7,371,428 B2 | 5/2008 | Russo et al. | |
| 8,070,039 B1 | 12/2011 | Johnson et al. | |
| 8,087,565 B2 | 1/2012 | Kottilingam et al. | |
| 8,703,044 B2 | 4/2014 | Sathian et al. | |
| 2003/0161055 A1 * | 8/2003 | Woodard | G02B 7/00 |
| | | | 359/819 |
| 2004/0013558 A1 | 1/2004 | Kondoh et al. | |
| 2005/0050705 A1 * | 3/2005 | Segletes | F01D 5/005 |
| | | | 29/402.13 |
| 2009/0041611 A1 | 2/2009 | Sathian et al. | |
| 2010/0102106 A1 | 4/2010 | Bray et al. | |
| 2010/0139091 A1 | 6/2010 | Lapp | |
| 2010/0325887 A1 | 12/2010 | Perret | |
| 2012/0049687 A1 | 3/2012 | Osborne et al. | |
| 2013/0167555 A1 * | 7/2013 | Schwarz | F01D 5/147 |
| | | | 60/805 |

OTHER PUBLICATIONS

K. Jayabharath et al., "Investigations on the Continuous Drive Friction Welding of Sintered Powder Metallurgical (P/M) Steel and Wrought Copper Parts", Materials Science and Engineering A, vol. 454-455, pp. 114-123, Apr. 3, 2007.

"Pre-Sintered Preforms", Morgan Technical Ceramics, wesgometals. com, http://www.wesgometals.com/products-materials/psp--presintered-preforms-products/, May 6, 2012.

"New Materials Take the Heat in Aerospace Engine Design and Manufacture", designworldonline.com, http://www.designworldonline.com/new-materials-take-the-heat-in-aerospace-engine-design-and-manufacture/, Nov. 11, 2009.

"Nickel With Chromium and/or Iron, Molybdenum, MAR-M-247 (Howmet Corp.)", Woldman's Engineering Alloys 9th ed. J. Frick Editor, ASM International 2000, 2 pages, May 20, 2014.

* cited by examiner

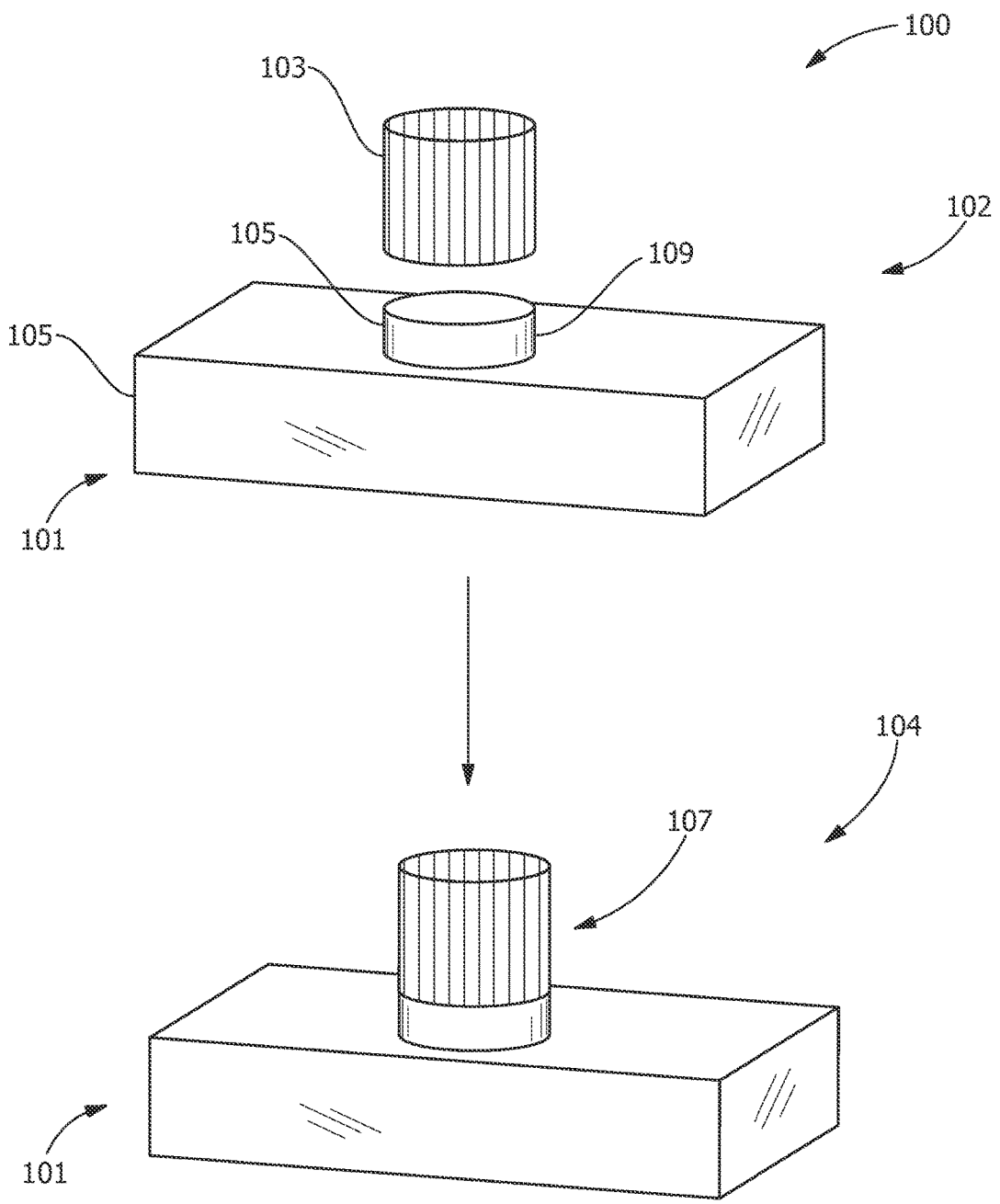

JOINING PROCESS AND JOINED ARTICLE

FIELD OF THE INVENTION

The present invention is directed to joining processes and joined articles. More particularly, the present invention is directed to a hybrid joining process of friction welding and brazing.

BACKGROUND OF THE INVENTION

High strength and oxidation resistant materials are often used in components for gas turbines. For example, nickel-based and cobalt-based superalloys are often used for buckets, blades, nozzles, or other components within gas turbines. Such superalloys can have poor weldability. Once formed, the properties required for these superalloys to survive in gas turbine applications, such as for example creep-rupture resistance, are developed by heat treatments that develop precipitates throughout the superalloy. These precipitates include gamma prime ($\gamma'$) and gamma double prime ($\gamma''$) uniformly distributed throughout a gamma matrix. These phases are developed by heat treatments while avoiding the formation of deleterious phases such as topologically close-packed (TCP) phases, Laves phases and other undesirable phases depending on the specific composition of the superalloy. The presence of these phases contributes to low ductility, brittleness, loss of other mechanical properties and possible detrimental effect on environmental properties such as corrosion resistance. After the microstructure has been developed in gas turbine articles or components comprising superalloys, care must be taken not to damage such articles or components, as the articles or components cannot be readily repaired without detrimentally affecting the developed microstructure using available procedures.

For example, features are added to components of gas turbines having nickel-based and cobalt-based superalloys by machining. Machining results in a loss of material and can be expensive. Machining can take a relatively long time, particularly for parts having complex geometries, and any mis-machining of the components and can result in scrappage of the articles or components.

In another example, parts taken out of service may experience service related wear or damage that cannot be restored to their original configuration using available techniques. The lack of a suitable repair procedure results in the scrappage of articles or components removed from service because of damage to key features or simple failure to meet dimensional criteria for continued use in gas turbine engines.

Features may be added to components of gas turbines comprising precipitation-hardenable nickel-based and cobalt-based superalloys by joining processes, such as brazing or welding. Each of these processes suffers from various infirmities, particularly once the precipitates have been developed in the superalloy. In order to be effective, both brazing and welding require the application of heat to the article or component being repaired, and this application of heat has a detrimental effect on the developed precipitates, altering the precipitates and frequently resulting in the formation of additional detrimental precipitates such as TCP phases, Laves phases and/or other detrimental phases depending on the specific composition of the superalloy.

Brazing is generally performed at elevated temperatures below the melting point of the base material but above the melting point of the braze material. Brazing is detrimental due to the heat required to successfully join, for example, a repair area or repair material to a fully developed article or component. As used herein, a fully developed article or component is one in which a precipitation-hardened microstructure, without the inclusion of detrimental phases, is developed throughout the article or component. Brazing uses a braze material that can introduce different considerations. For example, distortion sometimes occurs during the brazing process for certain braze materials. The braze metal, or at least one braze metal component of a multiple braze metal composition, has a lower melting temperature than the base materials that are to be joined. Multiple component braze materials are typically a mixture of metal particles, each of two or more different alloys, one of which includes a melting point depressant such as boron or silicon to achieve a lower melting point. In addition, brazing can require a higher level of sophistication from the operator. Brazing also requires placing an entire component into a vacuum furnace and heating of the entire component during the braze cycle, thereby limiting applicability to size constrained and/or temperature-sensitive applications. Not only is the entire component placed into the furnace and heated to an elevated temperature at which the lower melting point component melts, usually close to the melting point of the materials to be joined, but the component also is held at an elevated temperature while diffusion occurs between the low melt components and the high melt components so that the melting point depressant additions diffuse away from the braze zone and raise the melting temperature of the braze zone. As a result segregation in the braze zone is reduced and a more homogenous chemical composition is developed between what were the low melt and high melt components. However, these elevated temperature treatments undesirably affect the previously developed precipitates, resulting in their dissolution or growth, depending on the temperatures, grain growth in multiple-grained components, possible nucleation of new grains in previous single crystal components and formation of detrimental phases.

Welding similarly adds heat to affect the joining of new material to the previously fully developed article or component. In welding, sufficient heat must be added to melt the filler material. This heat not only melts the filler material, but also a localized portion of the component, the portion of the component being melted referred to as the base metal and the entire melted material being referred to as weld metal, but, as is well known, results in regions of the component or article adjacent to the weld metal being heated to elevated temperatures as heat conducts away from the weld metal. This region is referred to as the heat affected zone. The microstructure of the weld metal will have few or no precipitates, as the cooled weld metal has not been exposed to a heat treatment for the development of precipitates. The precipitates in the heat affected zone may experience growth due to elevated temperatures from the heat being conducted through it. In addition, this heat may be sufficient to cause the nucleation or precipitation of detrimental phases discussed above. Further heat treatment for stress relief or to attempt to develop precipitates in the weld metal will only exacerbate the problem of precipitate growth and detrimental phase formation in the heat affected zone but will likely extend the problem to the non-heat affected zone. None of this analysis even considers the effect of grain growth on the welded components due to welding and subsequent heat treatment.

Some components further include dimensional requirements for sealing and/or locating of sub-components. For example, some components have identifiable features on the sub-components. In some cases, such sub-components are re-designed due to the limitations of the selected joining process.

A process for repairing articles of components that enable the addition of material to the joined article while eliminating or minimizing one or more of the above drawbacks of prior art methods would be desirable in the art.

BRIEF DESCRIPTION OF THE INVENTION

In an exemplary embodiment, a process for repairing articles or components includes a joining process that minimizes the exposure of the article or component to elevated temperatures. This is particularly important for articles or components having microstructures that are sensitive to transformation as a result of temperature excursions above critical temperatures, transformation temperatures, or growth of precipitates or grains resulting from heat input. The repair process includes positioning an article or component having a base material with an age hardened microstructure, providing a sintered brazing preform, the sintered brazing preform being rigid and including a mixture of metal particles of two or more different alloys sintered together without melting either of the alloys, one of the alloys having a melting point depressant providing it with a lower melting point than the other alloy(s). The sintered brazing preform is friction joined to the base material forming the component or article. The sintered brazing preform is additive material to the article or component and is formed as a net shape feature or near-net shape feature that can be formed, such as by machining, into a feature on the article. Friction joining generates heat through mechanical friction between the component and the sintered braze preform. Sufficient friction is generated in the friction joining process to melt only the low melting point alloy of the sintered brazing preform, while the higher melting alloy(s) and the base material are not melted.

In another exemplary embodiment, a friction joining process includes positioning a turbine component having a base material, and friction joining a sintered brazing preform to the base material. The sintered brazing preform forms a feature on the turbine component. The base material has a composition, by weight, of between about 8.0% and about 8.7% Cr, between about 9% and about 10% Co, between about 5.25% and about 5.75% Al, up to about 0.9% Ti, between about 9.3% and about 9.7% W, up to about 0.6% Mo, between about 2.8% and about 3.3% Ta, between about 1.3% and about 1.7% Hf, up to about 0.1% C, up to about 0.02% Zr, up to about 0.02% B, up to about 0.2% Fe, up to about 0.06% Si, up to about 0.1% Mn, up to about 0.1% Cu, up to about 0.01% P, up to about 0.004% S, up to about 0.1% Nb, and a balance of nickel. The sintered brazing preform has a composition of, by weight, about 50% a first material and 50% a second material. The first material has a composition, by weight, of between about 8.0% and about 8.7% Cr, between about 9% and about 10% Co, between about 5.25% and about 5.75% Al, up to about 0.9% Ti, between about 9.3% and about 9.7% W, up to about 0.6% Mo, between about 2.8% and about 3.3% Ta, between about 1.3% and about 1.7% Hf, up to about 0.1% C, up to about 0.02% Zr, up to about 0.02% B, up to about 0.2% Fe, up to about 0.06% Si, up to about 0.1% Mn, up to about 0.1% Cu, up to about 0.01% P, up to about 0.004% S, up to about 0.1% Nb, and a balance of nickel. The second material has a composition, by weight, of about 14% Cr, about 10% Co, about 3.5% Al, about 2.75% B, between about 2.5% and about 2.75% Ta, up to about 0.1% Y, and a balance of nickel.

An interface region between the base material and the feature remains devoid of cracking when exposed to a temperature of between about 2000° F. and about 2100° F. for a duration of between about 90 minutes and about 150 minutes.

In another exemplary embodiment, a joined article includes a feature joined to a base material by friction joining of a sintered brazing preform.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 1 is a schematic view of an exemplary joining process according to the disclosure.

Wherever possible, the same reference numbers will be used throughout the drawings to represent the same parts.

DETAILED DESCRIPTION OF THE INVENTION

Provided is an exemplary joining process and joined article. Embodiments of the present disclosure, for example, in comparison to joining processes and joined articles that do not include one or more of the features disclosed herein, permit the joining of incompatible materials, reduce or eliminate mis-machining components, permit benefit from advantages of brazing and/or friction welding while avoiding the disadvantages of brazing and/or friction welding, permit increased metallurgical bonding, permit relatively unsophisticated operators to join elements, permit strainage-cracking to be reduced or eliminated (for example, after post-weld heat treatment), permit production standards to be achieved, permit repair cycles to be extended, permit costs to be reduced, or a combination thereof. While the joining process of the present invention finds applicability to a broad range of components or articles of either varying composition or similar composition, importantly, the hybrid joining process set forth herein finds particular use in joining of articles having precipitation hardened microstructures with minimal impact on the previously developed microstructures or permits the addition of material to repair or replace damaged features of the article or component having a previously developed microstructure with little or no impact on that microstructure.

Referring to FIG. 1, in one embodiment, a joining process 100 includes positioning an article 101 (step 102) comprising a base material, positioning a sintered brazing preform adjacent to the base material of the article so that and sintered brazing preform forms an interface with the base material of the article and friction joining the sintered brazing preform to the base material of article 101 (step 104) at the interface. The friction joining (step 104) joins a sintered brazing preform 103 to a base material 105 on the article 101 at the interface. The joining of the sintered brazing preform 103 and the base material 105 forms a feature 107 on the article 101. As used herein, the term friction joining refers to generating sufficient heat at the interface between the article or component and the sintered brazing preform to melt a low melt portion of the sintered brazing preform without melting the high melt portion of the sintered brazing preform or any of the base material of the component or article. The sintered preform provides a feature to the article or component such as may be needed to provide a repair. The feature may require machining to achieve final configuration. Alternatively, the feature may be net shape or near net shape, near net shape requiring minor material removal to achieve final configuration. Friction joining incorporates features of brazing, such as melting of a low melt component of a braze material without requiring heating of the entire article that is being brazed. It also incorporates elements of friction welding as it generates heat from friction, but the heat generated is sufficient to melt only the low melt component of a sintered braze preform so that the joining is at the interface by a quasi-braze joining process. Due to melting and solidification of the low melt component.

The article 101 is any suitable component. In one embodiment, the article 101 is a component or sub-component of a turbine, for example, a bucket, a blade, a nozzle, a turbine wheel, a platform to a blade, a dovetail for a blade, a seal, or any other suitable element. The turbine is a gas turbine, turbine engine, steam turbine, wind turbine, or any other power generation system or propulsion system. In turbine applications, these components are frequently used in the hot section of turbines and must withstand high stresses while surviving at high temperatures in corrosive and/or oxidative environments. When used in such applications, the components or articles comprise superalloy materials such as precipitation hardened and precipitation hardenable nickel-based superalloys and cobalt-based superalloys.

The feature 107 is any portion of the article 101 benefiting from the joining of the sintered brazing preform 103. In one embodiment, the feature 107 is a locating feature, a tongue or groove feature, an attachment feature, a keying feature, a protrusion, an interlocking feature, a securing feature, a mechanically interlocking feature, a fastening feature, an aperture arranged and disposed for closure, a distressed region, or a combination thereof.

The sintered brazing preform comprises a mixture of metal particles or powders of different alloys, the mixture initially prepared to contain a binder. The metal particles and binder are thoroughly mixed together so that there is a substantially uniform distribution of the components. The binder is removed during a sintering operation which is utilized to mold the preform into a desired shape so as to minimize or eliminate subsequent machining. The binder is usually a carbon-based material that is burned out at the elevated temperatures of sintering. The sintering is performed at a temperature that does not melt any of the metal particles, but is sufficiently high to bond the powders of the preform together, bonding occurring by diffusion mechanisms without melting. The sintering operation utilized in the preparation of the sintered braze preform may be performed under pressure. The sintered operation utilized in the preparation of the present invention precludes liquid phase sintering. Typically, at least one of the powders or particles of the sintered brazing preform is the same composition or nearly the same composition at the base material forming the component or article, and at least one of the powders or particles has a similar composition but includes a melting point depressant that lowers the melting point of that powder or particle component. In one embodiment, when the base material forming the component or article is a precipitation-hardened structure, such as may occur when the article is a superalloy such as turbine blade, bucket, nozzle, seal or other component from a turbine engine hot section, the powders or particles of the high melt component of the sintered brazing preform having the same composition as the article or component may be precipitation hardened prior to forming the sintered braze preform. Thus, when the friction joining according to the present invention is complete, a portion of the friction joint formed by sintered brazing preform will have a precipitation hardened microstructure. Such a treatment is not necessary for the low melt component as it will melt. This provides an advantage not available from welding processes and generally not available from brazing operations.

The friction joining (step 104) includes oscillation and/or vibration (as in linear-friction welding) and/or rotation (as in rotary-friction welding) of the sintered brazing preform 103 and/or the base material 105 with predetermined operational conditions prior to and during contact between the sintered brazing preform 103 and the base material 105 to form the feature 107. The friction joining (step 104) is performed with any suitable friction welding or vibration welding systems (not shown). In one embodiment, the friction joining (step 104) is performed within an inert atmosphere, for example, an atmosphere that is devoid or substantially devoid of oxygen, such as a nitrogen atmosphere or an argon atmosphere. The friction joining (step 104) is without additional heat or with additional heat (for example, pre-heating of between about 400° F. (204° C.) and about 2000° F. (1093° C.), of about 400° F., of about 1000° F. (538° C.), of about 1500° F. (816° C.), of about 2000° F., or any suitable combination, sub-combination, range, or sub-range thereof). For precipitation-hardened microstructures, the minimization of heat input advantageously minimizes or prevents heat related microstructure changes.

In one embodiment, the contact of the friction joining (step 104) is within a joining pressure range, for example, between about 30 ksi and about 50 ksi, between about 35 ksi and about 45 ksi, between about 35 ksi and about 50 ksi, between about 30 ksi and about 45 ksi, at about 42 ksi, at about 45 ksi, at about 50 ksi, or any suitable combination, sub-combination, range, or sub-range thereof. The pressure range identifies an amount of pressure applied to maintain contact during the friction joining (step 104).

In one embodiment, the oscillation and/or vibration of the friction joining (step 104) is for a predetermined duration, for example, between about 15 seconds and about 19 seconds, between about 16 seconds and about 18 seconds, between about 16 seconds and about 19 seconds, between about 15 seconds and about 18 seconds, of about 16 seconds, of about 17 seconds, of about 18 seconds, or any suitable combination, sub-combination, range, or sub-range thereof.

In one embodiment, the friction joining (step 104) includes an oscillation of the sintered brazing preform 103 and/or the base material 105 within an amplitude range of between about 4 mm and about 6 mm, between about 5 mm and about 6 mm, between about 4 mm and about 5 mm, at about 4 mm, at about 5 mm, at about 6 mm, or any suitable combination, sub-combination, range, or sub-range thereof.

In one embodiment, the friction joining (step 104) includes an oscillatory frequency of between about 25 Hz and about 400 Hz, between about 25 Hz and about 200 Hz, between about 25 Hz and about 100 Hz, between about 25 Hz and about 75 Hz, at about 25 Hz, about 50 Hz, at about 75 Hz, or any suitable combination, sub-combination, range, or sub-range thereof.

After the friction joining (step 104), the joining process 100 is devoid of brazing or is followed by brazing for certain material applications. In embodiments where the brazing follows the friction joining (step 104), the brazing provides additional securing of the feature 107 and/or secures other joints (not shown).

For the friction joining process, the applied pressure, the oscillatory frequency, the time and the amplitude of the frequency is selected so that sufficient heat is generated to melt the low melt component of the sintered brazing preform, but not to melt any of the high melt component of the sintered brazing preform or any of the component or article material. The amount of heat input into the system is limited to melting the sintered brazing preform at its interface with the component or article. As a result, the friction joint zone is limited to this narrow region at the interface between sintered brazing preform 103 and base material 105. The heat generated at this interface is very limited and dissipates rapidly through the article and possibly sintered brazing preform 103, the rapid dissipation resembling a quench. As a result, unlike in brazing in which both the brazing preform and base material are heated to the brazing temperature, only this interface and the material at the interface is heated to a temperature sufficient only to melt the low temperature component of sintered brazing preform 103. Unlike in welding, the amount of heat input at the interface and its rapid transfer away from the interface is insufficient to create a heat affected zone. Unlike in friction welding, there is melting at the interface, although the melting is restricted to the low melt component of sintered brazing preform 103.

Because of the minimal amount of heat generated at the interface and the rapid transfer of heat away from the interface, portions of sintered brazing preform 103 may still have a low melt constituent that is substantially unaffected by the friction joining process, and therefore may retain its low melting temperature. The melting point depressants that impart the low melting temperature to sintered brazing preform 103 are usually small rapidly diffusing elements such as boron or silicon. There are several methods to assure that this low melting point of the low melt component is not problematic. First, if the article or component will operate in an environment that is below the melting point of the low melt component, simply placing the article or component into service will result in diffusion of the melting point depressant away from sintered brazing preform 103 and the interface, raising the overall melting temperature of the restored or refurbished article. Alternatively, if the article or component is likely to be exposed to elevated temperatures that are problematic with respect to the low melt component after friction joining, the article may be heat treated at low temperatures. When the article of component is a precipitation-hardened article or component, the article or component may be soaked at a temperature sufficient to diffuse the melting point depressants, but at which temperature the precipitates are unaffected. Thus, for a gamma prime substrate article subjected to a friction joining process of the present invention, for example, a furnace treatment at about 1000° F. for several hours will result in diffusion of boron and/or silicon throughout the article, but will not adversely affect the gamma prime precipitates in the article or component. Other methods may also be utilized.

The article 101 includes material corresponding to the desired application. As shown in FIG. 1, in one embodiment, the entire article 101 includes the base material 105. Alternatively, in one embodiment, only a portion of the article 101, such as a protrusion 109, includes the base material 105.

In one embodiment, the base material 105 is compatible with the friction joining (step 104) and/or incompatible with non-friction based joining with the sintered brazing preform 103, such as, brazing and fusion welding. As used herein the term "compatible" refers to being devoid of or substantially devoid of cracks (for example, strain age cracks) or an undesirable deformation flow pattern resulting from joining or operational use, as can be formed in friction welding of precipitation hardened base metals to other base metals including other precipitation hardened metals, such as high gamma prime superalloy base metals to other superalloy base metals.

In one embodiment, the compatibility includes the base material 105 and the feature 107 remaining devoid of cracking when exposed to a suitable temperature for a suitable duration. Suitable temperatures include, but are not limited to, between about 2000° F. (1093° C.) and about 2100° F. (1149° C.), between about 2000° F. and about 2075° F. (1135° C.), between about 2025° F. (1107° C.) and about 2100° F. (1149° C.), between about 2025° F. and about 2075° F., at about 2025° F., at about 2050° F. (1121° C.), at about 2075° F., or any suitable combination, sub-combination, range, or sub-range therein. Suitable durations include, but are not limited to, between about 90 minutes and about 150 minutes, between about 120 minutes and about 150 minutes, between about 90 minutes and about 120 minutes, for about 90 minutes, for about 120 minutes, for about 150 minutes, or any suitable combination, sub-combination, range, or sub-range therein.

Suitable materials for the base material 105 include, but are not limited to, nickel-based alloys and cobalt-based alloys. In one embodiment, the base material 105 has a composition, by weight, of between about 8.0% and about 8.7% Cr, between about 9% and about 10% Co, between about 5.25% and about 5.75% Al, up to about 0.9% Ti (for example, between about 0.6% and about 0.9%), between about 9.3% and about 9.7% W, up to about 0.6% Mo (for example, between about 0.4% and about 0.6%), between about 2.8% and about 3.3% Ta, between about 1.3% and about 1.7% Hf, up to about 0.1% C (for example, between about 0.07% and about 0.1%), up to about 0.02% Zr (for example, between about 0.005% and about 0.02%), up to about 0.02% B (for example, between about 0.01% and about 0.02%), up to about 0.2% Fe, up to about 0.06% Si, up to about 0.1% Mn, up to about 0.1% Cu, up to about 0.01% P, up to about 0.004% S, up to about 0.1% Nb, and a balance of nickel.

In one embodiment, the base material 105 has a composition, by weight, of between about 13.7% and about 14.3% Cr, between about 9% and about 10% Co, between about 2.8% and about 3.2% Al, between about 4.7% and about 5.1% Ti, between about 3.5% and about 4.1% W, between about 1.4% and about 1.7% Mo, between about 2.4% and about 3.1% Ta, up to about 0.12% C (for example, between about 0.08% and about 0.12%), up to about 0.04% Zr, up to about 0.02% B (for example, between about 0.005% and about 0.020%), up to about 0.35% Fe, up to about 0.3% Si, up to about 0.1% Mn, up to about 0.1% Cu, up to about 0.015% P, up to about 0.005% S, up to about 0.15% Nb, and a balance of nickel.

In one embodiment, the base material 105 has a composition, by weight, of about 7.5% Co, about 9.75% Cr, about 4.2% Al, about 3.5% Ti, about 1.5% Mo, about 4.8% Ta, about 6% W, up to about 0.5% Nb, up to about 0.15% Hf, up to about 0.08% C, up to about 0.00925% B, and a balance nickel.

In one embodiment, the base material 105 has a composition, by weight, of about 7% Cr, about 8% Co, about 2% Mo, about 5% W, about 6% Ta, about 6.2% Al, up to about 0.2% Hf, about 3% Re, and a balance nickel.

Suitable materials for the sintered brazing preform 103 include, but are not limited to, a mixture of a first material having a first melting point and a second material having a second melting point, the first melting point being lower than the second melting point. The mixture is at any suitable ratio for providing desired properties. Suitable ratios for the mixture include, but are not limited to, between about 40% and about 95% being the first material, between about 50% and about 80% being the first material, between about 5% and about 60% being the second material, between about 20% and about 50% being the second material, about 50% being the first material, about 50% being the second material, about 20% being the second material, about 80% being the first material, or any suitable combination, sub-combination, range, or sub-range therein.

In one embodiment, the first material is considered as a high-melt material and the first melting point is below about 2192° F. (1200° C.), for example, between about 2048° F. (1120° C.) and about 2084° F. (1140° C.). In one embodiment, the second material is considered as a low-melt material and the second melting point is above about 2192° F. (1200° C.).

A suitable high-melt material has a composition, by weight, of between about 13.7% and about 14.3% Cr, between about 9% and about 10% Co, between about 2.8% and about 3.2% Al, between about 4.7% and about 5.1% Ti, between about 3.5% and about 4.1% W, between about 1.4% and about 1.7% Mo, between about 2.4% and about 3.1% Ta, up to about 0.12% C (for example, between about 0.08% and about 0.12%), up to about 0.04% Zr, up to about 0.02% B (for example, between about 0.005% and about 0.020%), up to about 0.35% Fe, up to about 0.3% Si, up to about 0.1% Mn, up to about 0.1% Cu, up to about 0.015% P, up to about 0.005% S, up to about 0.15% Nb, and a balance of nickel.

Another suitable high-melt material has a composition, by weight, of between about 8.0% and about 8.7% Cr, between about 9% and about 10% Co, between about 5.25% and about 5.75% Al, up to about 0.9% Ti (for example, between about 0.6% and about 0.9%), between about 9.3% and about 9.7% W, up to about 0.6% Mo (for example, between about 0.4% and about 0.6%), between about 2.8% and about 3.3% Ta, between about 1.3% and about 1.7% Hf, up to about 0.1% C (for example, between about 0.07% and about 0.1%), up to about 0.02% Zr (for example, between about 0.005% and about 0.02%), up to about 0.02% B (for example, between about 0.01% and about 0.02%), up to about 0.2% Fe, up to about 0.06% Si, up to about 0.1% Mn, up to about 0.1% Cu, up to about 0.01% P, up to about 0.004% S, up to about 0.1% Nb, and a balance of nickel.

Another suitable high-melt material has a composition, by weight, of between about 13.7% and about 14.3% Cr, between about 9% and about 10% Co, between about 2.8% and about 3.2% Al, between about 4.8% and about 5.2% Ti, between about 3.7% and about 4.3% W, between about 3.7% and about 4.3% Mo, up to about 0.1% Re (with Re and W being less than about 4.3%), up to about 0.1% Ta, up to about 0.1% Hf, up to about 0.19% C (for example, between about 0.15% and about 0.19%), up to about 0.15% Pd, up to about 0.3% Pt, up to about 0.01% Mg, up to about 0.1% Zr (for example, between about 0.02% and about 0.1%), up to about 0.02% B (for example, between about 0.01% and about 0.02%), up to about 0.35% Fe, up to about 0.1% Si, up to about 0.1% Mn, up to about 0.015% P, up to about 0.0075% S, up to about 0.1% Nb, and a balance of nickel.

Another suitable high-melt material has a composition, by weight, of between about 6.6% and about 7% Cr, between about 11.45% and about 12.05% Co, between about 5.94% and about 6.3% Al, up to about 0.02% Ti, between about 4.7% and about 5.1% W, between about 1.3% and about 1.7% Mo, between about 2.6% and about 3% Re, between about 6.2% and about 6.5% Ta, between about 1.3% and about 1.7% Hf, up to about 0.14% C (for example, between about 0.1% and about 0.14%), up to about 0.3% Pt, up to about 0.0035% Mg, up to about 0.03% Zr, up to about 0.02% B (for example, between about 0.01% and about 0.02%), up to about 0.2% Fe, up to about 0.06% Si, up to about 0.1% Mn, up to about 0.01% P, up to about 0.004% S, up to about 0.1% Nb, and a balance of nickel.

Another suitable high-melt material has a composition, by weight, of between about 16.5% and about 18.5% Cr, between about 27% and about 30% Mo, about 1.5% Ni, up to about 0.08% C, about 1.5% Fe, between about 3% and about 3.8% Si, up to about 0.03% P, up to about 0.03% S, up to about 0.15% O, and a balance of cobalt.

A suitable low-melt material has a composition, by weight, of between about 22.5% and about 24.25% Cr, up to about 0.3% Ti (for example, between about 0.15% and about 0.3%), between about 6.5% and about 7.5% W, between about 9% and about 11% Ni, between about 3% and about 4% Ta, up to about 0.65% C (for example, between about 0.55% and about 0.65%), between about 2% and about 3% B, about 1.3% Fe, up to about 0.4% Si, up to about 0.1% Mn, up to about 0.02% S, and a balance of cobalt.

Another suitable low-melt material has a composition, by weight, of about 14% Cr, about 10% Co, about 3.5% Al, about 2.75% B, between about 2.5% and about 2.75% Ta, up to about 0.1% Y, and a balance of nickel.

Another suitable low-melt material has a composition, by weight, of about 14% Cr, about 9% Co, about 4% Al, about 2.5% B, and a balance of nickel.

Another suitable low-melt material has a composition, by weight, of about 15.3% Cr, about 10.3% Co, about 3.5% Ta, about 3.5% Al, about 2.3% B, and a balance of nickel.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A joining process, comprising:
   providing an article having a base material comprising a superalloy;
   positioning the article;
   providing a sintered brazing preform comprising a low melt portion and a high melt portion;
   positioning the sintered brazing preform adjacent the base material so that the sintered brazing preform forms an interface with the base material of the article; and
   friction joining the sintered brazing preform to the base material by generating sufficient heat by friction at the interface to melt the low melt portion of the sintered brazing preform at the interface without melting the high melt portion of the sintered brazing preform or the base material of the article;
   wherein the sintered brazing preform forms a feature on the article.

2. The joining process of claim 1 wherein the step of providing a sintered brazing preform further comprises:
   providing particles comprising a first metal alloy having a first melting temperature;

providing particles comprising a second metal alloy having a second melting temperature, the second melting temperature being lower than the first melting temperature, the second metal alloy including at least one melting point depressant;

providing a binder;

uniformly mixing the first metal alloy particles, the second metal alloy particles and the binder; and sintering the first metal alloy particles and the second metal alloy particles at a first elevated temperature sufficient to burn out the binder while bonding the first metal alloy particles and the second metal alloy particles together without melting the second metal alloy particles.

3. The joining process of claim 1 wherein the step of providing the article having the base material further comprises providing an article wherein the superalloy is a precipitation hardened superalloy.

4. The joining process of claim 2 wherein the step of providing particles comprising a first metal alloy further includes providing particles of a precipitation hardened superalloy.

5. The joining process of claim 2 wherein the step of providing particles comprising a first metal alloy further includes providing first metal alloy particles having the same composition as the base material.

6. The joining process of claim 1 wherein the feature formed on the article is net shape.

7. The joining process of claim 1 further including an additional step of machining the feature on the article to a final configuration.

8. The joining process of claim 1 wherein the feature formed on the article is near net shape and further includes an additional step of material removal to a final configuration.

9. The joining process of claim 1, wherein the friction joining is at a pressure between about 30 ksi and about 50 ksi.

10. The joining process of claim 1, wherein the friction joining is for a duration of between about 15 seconds and about 19 seconds.

11. The joining process of claim 1, wherein the friction joining has an amplitude of between about 4 mm and about 6 mm.

12. The joining process of claim 1, wherein the friction joining has an oscillatory frequency of between about 25 Hz and about 400 Hz.

13. The joining process of claim 1, wherein an interface region between the base material and the sintered brazing preform remains devoid of cracking when exposed to a temperature of between about 2000° F. and about 2100° F. for a duration of between about 90 minutes and about 150 minutes.

14. The joining process of claim 1, wherein the base material is incompatible for non-friction based joining with the sintered brazing preform.

15. The joining process of claim 1, wherein the superalloy is a nickel-based alloy.

16. The joining process of claim 1, wherein the superalloy is a cobalt-based alloy.

17. The joining process of claim 1, wherein the superalloy has a composition, by weight, of:

between about 8.0% and about 8.7% Cr, between about 9% and about 10% Co, between about 5.25% and about 5.75% Al, up to about 0.9% Ti, between about 9.3% and about 9.7% W, up to about 0.6% Mo, between about 2.8% and about 3.3% Ta, between about 1.3% and about 1.7% Hf, up to about 0.1% C, up to about 0.02% Zr, up to about 0.02% B, up to about 0.2% Fe, up to about 0.06% Si, up to about 0.1% Mn, up to about 0.1% Cu, up to about 0.01% P, up to about 0.004% S, up to about 0.1% Nb, and the balance nickel;

between about 13.7% and about 14.3% Cr, between about 9% and about 10% Co, between about 2.8% and about 3.2% Al, between about 4.7% and about 5.1% Ti, between about 3.5% and about 4.1% W, between about 1.4% and about 1.7% Mo, between about 2.4% and about 3.1% Ta, up to about 0.12% C, up to about 0.04% Zr, up to about 0.02% B, up to about 0.35% Fe, up to about 0.3% Si, up to about 0.1% Mn, up to about 0.1% Cu, up to about 0.015% P, up to about 0.005% S, up to about 0.15% Nb, and the balance nickel;

about 7.5% Co, 9.75% Cr, about 4.2% Al, 3.5% Ti, about 1.5% Mo, about 4.8% Ta, about 6% W, up to about 0.5% Nb, up to about 0.15% Hf, up to about 0.08% C, up to about 0.00925% B, and the balance nickel; and about 7% Cr, about 8% Co, about 2% Mo, about 5% W, about 6% Ta, about 6.2% Al, up to about 0.2% Hf, about 3% Re, and the balance nickel.

18. The joining process of claim 2, wherein the second metal alloy is at a concentration, by weight, of between about 5% and about 60%.

19. The joining process of claim 2, wherein the first metal alloy is at a concentration, by weight, of between about 40% and about 95%.

20. The joining process of claim 2, wherein the first metal alloy has a composition selected from the group consisting of, by weight, of:

between about 13.7% and about 14.3% Cr, between about 9% and about 10% Co, between about 2.8% and about 3.2% Al, between about 4.7% and about 5.1% Ti, between about 3.5% and about 4.1% W, between about 1.4% and about 1.7% Mo, between about 2.4% and about 3.1% Ta, up to about 0.12% C, up to about 0.04% Zr, up to about 0.02% B, up to about 0.35% Fe, up to about 0.3% Si, up to about 0.1% Mn, up to about 0.1% Cu, up to about 0.015% P, up to about 0.005% S, up to about 0.15% Nb, and the balance nickel;

between about 8.0% and about 8.7% Cr, between about 9% and about 10% Co, between about 5.25% and about 5.75% Al, up to about 0.9% Ti, between about 9.3% and about 9.7% W, up to about 0.6% Mo, between about 2.8% and about 3.3% Ta, between about 1.3% and about 1.7% Hf, up to about 0.1% C, up to about 0.02% Zr, up to about 0.02% B, up to about 0.2% Fe, up to about 0.06% Si, up to about 0.1% Mn, up to about 0.1% Cu, up to about 0.01% P, up to about 0.004% S, up to about 0.1% Nb, and the balance nickel;

between about 13.7% and about 14.3% Cr, between about 9% and about 10% Co, between about 2.8% and about 3.2% Al, between about 4.8% and about 5.2% Ti, between about 3.7% and about 4.3% W, between about 3.7% and about 4.3% Mo, up to about 0.1% Re, up to about 0.1% Ta, up to about 0.1% Hf, up to about 0.19% C, up to about 0.15% Pd, up to about 0.3% Pt, up to about 0.01% Mg, up to about 0.1% Zr, up to about 0.02% B, up to about 0.35% Fe, up to about 0.1% Si, up to about 0.1% Mn, up to about 0.015% P, up to about 0.0075% S, up to about 0.1% Nb, and the balance nickel;

between about 6.6% and about 7% Cr, between about 11.45% and about 12.05% Co, between about 5.94% and about 6.3% Al, up to about 0.02% Ti, between about 4.7% and about 5.1% W, between about 1.3% and about 1.7% Mo, between about 2.6% and about 3% Re, between about 6.2% and about 6.5% Ta, between about 1.3% and about 1.7% Hf, up to about 0.14% C, up to about 0.3% Pt, up to about 0.0035% Mg, up to about 0.03% Zr, up to about 0.02% B, up to about 0.2% Fe, up to about 0.06% Si, up to about 0.1% Mn, up to about 0.01% P, up to about 0.004% S, up to about 0.1% Nb, and the balance nickel; and between about 16.5% and about 18.5% Cr, between about 27% and about 30% Mo, about 1.5% Ni, up to about 0.08% C, about 1.5% Fe, between about 3% and about 3.8% Si, up to about 0.03% P, up to about 0.03% S, up to about 0.15% O, and the balance cobalt.

21. The joining process of claim 2, wherein the second metal alloy has a composition selected from the group consisting of, by weight, of:

between about 22.5% and about 24.25% Cr, up to about 0.3% Ti, between about 6.5% and about 7.5% W, between about 9% and about 11% Ni, between about 3% and about 4% Ta, up to about 0.65% C, between about 2% and about 3% B, about 1.3% Fe, up to about 0.4% Si, up to about 0.1% Mn, up to about 0.02% S, and the balance cobalt;

about 14% Cr, about 10% Co, about 3.5% Al, about 2.75% B, between about 2.5% and about 2.75% Ta, up to about 0.1% Y, and the balance nickel;

about 14% Cr, about 9% Co, about 4% Al, about 2.5% B, and the balance nickel;

about 15.3% Cr, about 10.3% Co, about 3.5% Ta, about 3.5% Al, about 2.3% B, and the balance nickel; and about 28% Mo, about 17% Cr, about 3% Si, and the balance cobalt.

22. The joining process of claim 1, wherein the friction joining is in an inert environment with heat of at least about 400° F.

23. The joining process of claim 1, wherein the article is a turbine component selected from the group consisting of a bucket, a blade, a nozzle, a turbine wheel, a platform, a dovetail, a seal, and combinations thereof.

24. The joining process of claim 1, wherein the article is a component of a system selected from the group consisting of a gas turbine, a turbine engine, a steam turbine, a wind turbine, a power generation system, a propulsion system, and combinations thereof.

25. The method of claim 1, wherein the base material is not melted by the heat by friction generated from the friction joining.

26. A joining process, comprising:

positioning a turbine component having a base material; and friction joining a sintered brazing preform comprising a low melt portion and a high melt portion to the base material by generating sufficient heat by friction at an interface between the turbine component and the sintered brazing preform to heat the interface to a brazing temperature and melt the low melt portion of the sintered brazing preform at the interface without melting the high melt portion of the sintered brazing preform or the base material of the turbine component;

wherein the sintered brazing preform forms a feature on the turbine component;

wherein the base material has a composition, by weight, of between about 8.0% and about 8.7% Cr, between about 9% and about 10% Co, between about 5.25% and about 5.75% Al, up to about 0.9% Ti, between about 9.3% and about 9.7% W, up to about 0.6% Mo, between about 2.8% and about 3.3% Ta, between about 1.3% and about 1.7% Hf, up to about 0.1% C, up to about 0.02% Zr, up to about 0.02% B, up to about 0.2% Fe, up to about 0.06% Si, up to about 0.1% Mn, up to about 0.1% Cu, up to about 0.01% P, up to about 0.004% S, up to about 0.1% Nb, and the balance nickel;

wherein the sintered brazing preform has a composition of, by weight, about 50% of a first metal alloy and 50% of a second metal alloy;

wherein the first metal alloy has a composition, by weight, of between about 8.0% and about 8.7% Cr, between about 9% and about 10% Co, between about 5.25% and about 5.75% Al, up to about 0.9% Ti, between about 9.3% and about 9.7% W, up to about 0.6% Mo, between about 2.8% and about 3.3% Ta, between about 1.3% and about 1.7% Hf, up to about 0.1% C, up to about 0.02% Zr, up to about 0.02% B, up to about 0.2% Fe, up to about 0.06% Si, up to about 0.1% Mn, up to about 0.1% Cu, up to about 0.01% P, up to about 0.004% S, up to about 0.1% Nb, and the balance nickel;

wherein the second metal alloy has a composition, by weight, of about 14% Cr, about 10% Co, about 3.5% Al, about 2.75% B, between about 2.5% and about 2.75% Ta, up to about 0.1% Y, and the balance nickel;

wherein an interface region between the base material and the feature remains devoid of cracking when exposed to a temperature of between about 2000° F. and about 2100° F. for a duration of between about 90 minutes and about 150 minutes.

\* \* \* \* \*